United States Patent
Sinha et al.

(10) Patent No.: US 10,819,696 B2
(45) Date of Patent: Oct. 27, 2020

(54) KEY ATTESTATION STATEMENT GENERATION PROVIDING DEVICE ANONYMITY

(71) Applicant: Microsoft Technology Licensing, LLC, Redmond, WA (US)

(72) Inventors: Saurav Sinha, Kirkland, WA (US); Victor Warren Heller, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 26 days.

(21) Appl. No.: 15/649,085

(22) Filed: Jul. 13, 2017

(65) Prior Publication Data

US 2019/0020647 A1     Jan. 17, 2019

(51) Int. Cl.
*H04L 29/06* (2006.01)
*G06F 21/73* (2013.01)
(Continued)

(52) U.S. Cl.
CPC .......... *H04L 63/0823* (2013.01); *G06F 21/33* (2013.01); *G06F 21/57* (2013.01);
(Continued)

(58) Field of Classification Search
CPC ............. H04L 63/0823; H04L 63/0407; H04L 9/3265; H04L 9/321; H04L 9/0825;
(Continued)

(56) References Cited

U.S. PATENT DOCUMENTS

| 8,544,092 B2 | 9/2013 | Hermann et al. |
| 8,782,401 B2 | 7/2014 | Sarangdhar et al. |

(Continued)

FOREIGN PATENT DOCUMENTS

WO     2011139135 A1     11/2011

OTHER PUBLICATIONS

"International Search Report & Written Opinion for PCT Application No. PCT/US2018/034795", dated Oct. 19, 2018, 19 Pages.
(Continued)

*Primary Examiner* — Aravind K Moorthy
(74) *Attorney, Agent, or Firm* — Fiala & Weaver P.L.L.C.

(57) ABSTRACT

A computing device sends a request for an attestation certificate to an attestation service along with information regarding the hardware and/or software of the device. The attestation service processes the request and verifies the information received from the device. After verifying the information, the attestation service selects a public/private key pair from a collection of reusable public/private key pairs and generates an attestation certificate for the device and public key of the public/private key pair. This attestation certificate is digitally signed by the attestation service and returned to the device. The private key of the selected public/private key pair is also encrypted to a trusted secure component of the device, ensuring that the key cannot be stolen by malware and re-used on another device, and is returned to the device. The device uses this attestation certificate to access relying parties, and optionally generates additional public/private key pairs and attestation certificates.

20 Claims, 6 Drawing Sheets

(51) Int. Cl.
| | |
|---|---|
| *H04L 9/32* | (2006.01) |
| *G06F 21/72* | (2013.01) |
| *H04L 9/08* | (2006.01) |
| *H04L 9/00* | (2006.01) |
| *G06F 21/57* | (2013.01) |
| *G06F 21/33* | (2013.01) |

(52) U.S. Cl.
CPC .............. *G06F 21/72* (2013.01); *G06F 21/73* (2013.01); *H04L 9/006* (2013.01); *H04L 9/0825* (2013.01); *H04L 9/0897* (2013.01); *H04L 9/321* (2013.01); *H04L 9/3265* (2013.01); *H04L 63/0407* (2013.01); *H04L 63/0435* (2013.01); *H04L 63/0442* (2013.01); *H04L 63/061* (2013.01); *H04L 63/062* (2013.01); *H04L 2209/42* (2013.01)

(58) Field of Classification Search
CPC ... H04L 9/006; H04L 63/0435; H04L 63/062; H04L 63/061; H04L 63/0442; H04L 2209/42; G06F 21/73; G06F 21/72; G06F 21/57; G06F 21/33
USPC ........................................................ 713/156
See application file for complete search history.

(56) References Cited

U.S. PATENT DOCUMENTS

| | | | |
|---|---|---|---|
| 9,391,980 B1 | 7/2016 | Krahn et al. | |
| 2002/0019938 A1* | 2/2002 | Aarons | G06Q 20/00 713/168 |
| 2002/0129261 A1* | 9/2002 | Cromer | G06Q 20/40975 713/193 |
| 2003/0084311 A1* | 5/2003 | Merrien | H04L 63/12 713/191 |
| 2003/0126131 A1* | 7/2003 | Cihula | H04L 9/3263 |
| 2004/0146015 A1* | 7/2004 | Cross | H04L 63/0823 370/328 |
| 2005/0132182 A1 | 6/2005 | Challener et al. | |
| 2005/0132202 A1* | 6/2005 | Dillaway | H04L 9/3226 713/179 |
| 2005/0278253 A1* | 12/2005 | Meek | G06F 21/31 705/50 |
| 2005/0284935 A1* | 12/2005 | Sinha | G07C 13/00 235/386 |
| 2007/0100762 A1* | 5/2007 | Luo | G06F 21/105 705/59 |
| 2007/0150737 A1* | 6/2007 | Parupudi | H04L 9/3263 713/175 |
| 2007/0179907 A1* | 8/2007 | Waris | G06F 21/575 705/76 |
| 2010/0058047 A1* | 3/2010 | Medvinsky | H04L 9/321 713/2 |
| 2010/0131765 A1* | 5/2010 | Bromley | H04L 63/0414 713/175 |
| 2011/0296172 A1 | 12/2011 | Fu et al. | |
| 2012/0137364 A1 | 5/2012 | Blaisdell | |
| 2012/0300939 A1* | 11/2012 | Du | H04L 63/061 380/279 |
| 2013/0151848 A1* | 6/2013 | Baumann | H04L 9/3263 713/164 |
| 2013/0243187 A1* | 9/2013 | Horstmeyer | H04L 9/0897 380/28 |
| 2014/0115659 A1* | 4/2014 | Attfield | H04L 63/20 726/1 |
| 2014/0123170 A1* | 5/2014 | Kummer | H04N 21/2347 725/31 |
| 2014/0208404 A1* | 7/2014 | Brouwer | H04L 63/062 726/6 |
| 2014/0259132 A1* | 9/2014 | Gough | H04L 63/0823 726/6 |
| 2014/0281497 A1* | 9/2014 | Medvinsky | H04L 9/0825 713/156 |
| 2014/0281500 A1* | 9/2014 | Ignatchenko | G06F 21/53 713/156 |
| 2015/0113618 A1 | 4/2015 | Sinha et al. | |
| 2015/0333904 A1* | 11/2015 | Udupi | H04L 9/0825 380/278 |
| 2016/0080380 A1* | 3/2016 | Dawoud Shenouda Dawoud | H04L 9/3236 713/156 |
| 2016/0127327 A1* | 5/2016 | Mehta | H04L 63/0428 713/168 |
| 2016/0241558 A1* | 8/2016 | Adam | H04L 63/0876 |
| 2016/0275461 A1 | 9/2016 | Sprague et al. | |
| 2016/0323736 A1* | 11/2016 | Donahue | H04W 12/04 |
| 2016/0344725 A1* | 11/2016 | Severin | H04L 9/006 |
| 2017/0093586 A1* | 3/2017 | Miranda | H04L 9/3268 |
| 2017/0093830 A1* | 3/2017 | Wuehler | H04L 63/08 |
| 2017/0140151 A1* | 5/2017 | Nelson | G06F 1/26 |
| 2017/0161505 A1* | 6/2017 | Campagna | G06F 21/57 |
| 2017/0223012 A1* | 8/2017 | Xu | G06F 21/33 |
| 2017/0230365 A1* | 8/2017 | Poete | H04L 63/061 |
| 2017/0243021 A1* | 8/2017 | Gupta | G06F 21/6218 |
| 2017/0308621 A1* | 10/2017 | Wu | G06F 16/9024 |
| 2017/0337755 A1* | 11/2017 | Biehl | H04W 24/08 |
| 2018/0084042 A1* | 3/2018 | Finlow-Bates | H04L 67/104 |
| 2018/0101677 A1* | 4/2018 | Broumas | G06F 21/575 |
| 2018/0159843 A1* | 6/2018 | Sajja | G06F 3/0622 |
| 2018/0183777 A1* | 6/2018 | Guillory | H04L 63/083 |
| 2018/0255456 A1* | 9/2018 | Yin | H04L 63/0876 |
| 2018/0287802 A1* | 10/2018 | Brickell | H04L 9/14 |
| 2018/0287920 A1* | 10/2018 | Sanganabhatla | H04L 43/0876 |
| 2018/0359241 A1* | 12/2018 | Brockhaus | H04L 63/062 |
| 2018/0375852 A1* | 12/2018 | Thom | H04L 9/3268 |
| 2019/0158470 A1* | 5/2019 | Wright | H04L 9/085 |

OTHER PUBLICATIONS

Cheng, et al., "A Security-Enhanced Remote Platform Integrity Attestation Scheme", In Proceedings of 5th International Conference on Wireless Communications, Networking and Mobile Computing, Sep. 24, 2009, 4 pages.
Mathers, et al., "TPM Key Attestation", https://docs.microsoft.com/en-us/windows-server/identity/ad-ds/manage/component-updates/tpm-key-attestation, Published on: Feb. 9, 2017, 13 pages.
Yeluri, et al., "Attestation: Proving Trustability", In Publication of Springer, Mar. 27, 2014, 17 pages.
"Trusted Platform Module Library Part 2: Structures", Family "2.0"—Level 00 Revision 01.16, Oct. 30, 2014, 163 pages.
"Trusted Platform Module Library Part 1: Architecture", Family "2.0" Level 00 Revision 01.16, Oct. 30, 2014, 269 pages.
"Trusted Platform Module Library Part 3: Commands", Family "2.0"—Level 00 Revision 01.16, Oct. 30, 2014, 464 pages.
"Trusted Platform Module Library Part 4: Supporting Routines", Family "2.0"—Level 00 Revision 01.16, Oct. 30, 2014, 583 pages.
Salah,"FIDO UAF Architectural Overview", FIDO Alliance Implementation Draft, Feb. 2, 2017, 9 pages.
Srinivas,"Universal 2nd Factor (U2F) Overview", FIDO Alliance Implementation Draft, Sep. 15, 2016, 12 pages.

* cited by examiner

KEY ATTESTATION STATEMENT GENERATION PROVIDING DEVICE ANONYMITY

BACKGROUND

Computing devices have become increasingly interconnected, resulting in services being available to these devices that provide a large amount of information and/or functionality to the users of these devices. The availability of this information and functionality is helpful to users, but is not without its problems. One such problem is that users also oftentimes desire to maintain their privacy. However, accessing these services can involve at least some identification of the user and/or the user's device, which if spread to or shared with other services would reduce the privacy the users have. This can lead to user dissatisfaction with their devices and/or the services they access.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in an attestation service a request for an attestation certificate for a computing device is received from the computing device. The request includes information describing the hardware and/or software of the computing device. The received information is verified, and an asymmetric key pair from a collection of asymmetric key pairs is selected, the selected key pair also being selected for multiple additional computing devices. The attestation certificate for the computing device is generated associating the public key of the selected key pair with the attestation certificate. The private key of the selected key pair is encrypted for the first computing device. The encrypted private key of the selected key pair and the attestation certificate are returned to the first computing device.

In accordance with one or more aspects, in a computing device a request for an attestation certificate for the computing device is sent to an attestation service, the request including information describing the hardware and/or software of the computing device. A public/private key pair and the attestation certificate that associates the public/private key pair with a trusted secure component of the computing device are received from the attestation service. The private key of the public/private key pair is stored in a secure store of the trusted secure component. One or more additional public/private key pairs and one or more additional attestation certificates are generating without accessing the attestation service, each additional attestation certificates chaining up to the attestation service.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
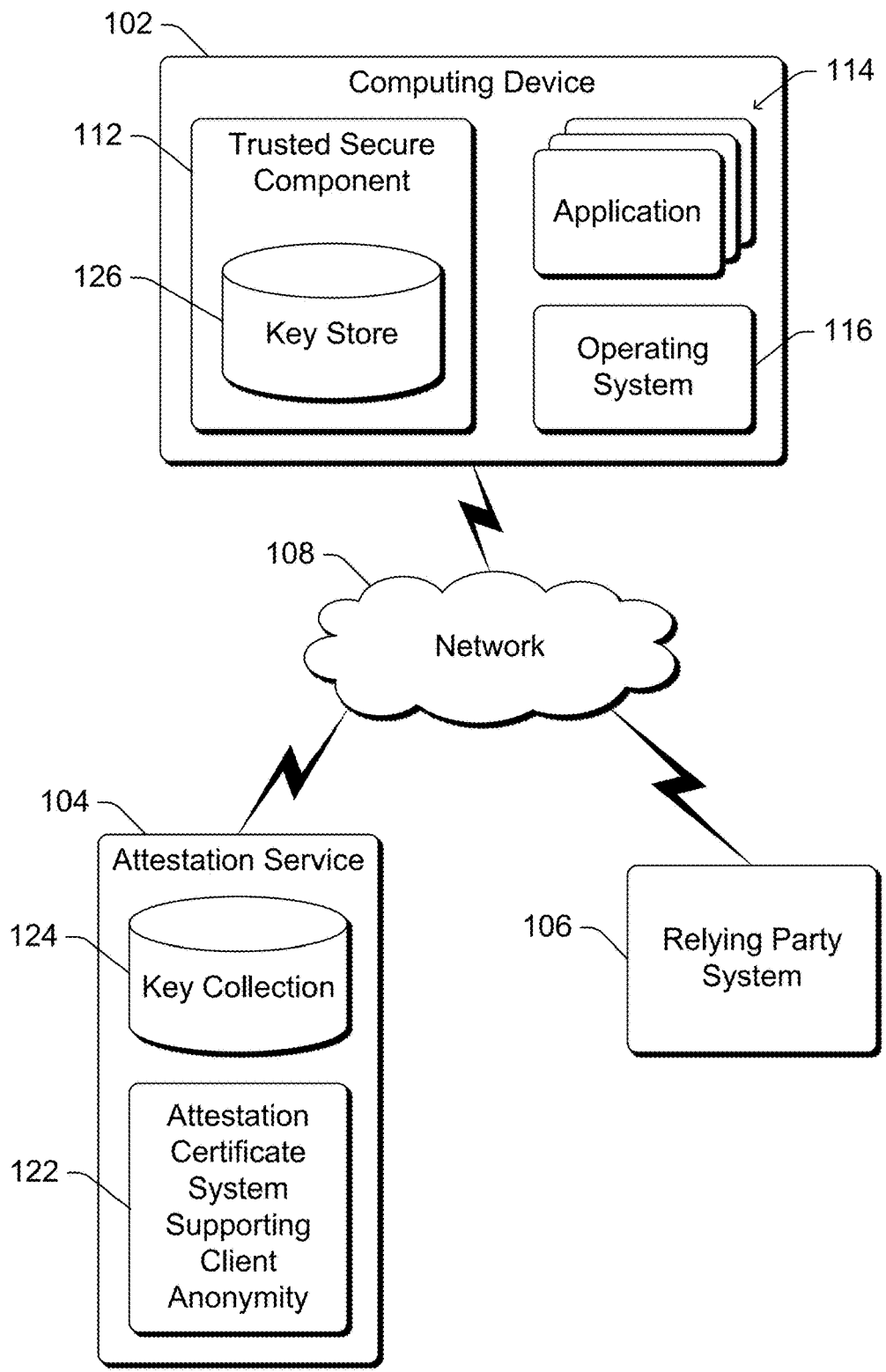
FIG. 1 illustrates an example system implementing the key attestation statement generation providing device anonymity in accordance with one or more embodiments.

Key attestation statement generation providing device anonymity is discussed herein. In order for a computing device to access a system that requires proof that the computing device is the device it claims to be, the computing device obtains an attestation certificate from a trusted third party. This trusted third party is also referred to as an attestation service or certification authority. The computing device sends a request for an attestation certificate to the attestation service along with information regarding the hardware of the computing device and optionally software running on the computing device. This information comes from a trusted secure component of the computing device and thus can be trusted by the attestation service. The computing device also sends a public key of an encryption key to the attestation service. This encryption key is an asymmetric key pair that resides in the trusted secure component of the computing device, which ensures that the private key of the encryption key cannot be harvested by malware from the computing device and used elsewhere.

The attestation service processes the attestation certificate request and verifies the information received from the computing device. This verification can include various actions, such as verifying that the computing device includes particular hardware, verifying that particular software is running on the computing device, and so forth. After the attestation service verifies the hardware and/or software properties of the attestation certificate request, the attestation service is assured that the properties are genuine hence it can verify by induction that if the genuine properties attest to the presence of the encryption key belonging to the trusted secure component, then anything encrypted to the public key of the encryption key can only be decrypted by the trusted secure component.

The attestation service maintains a collection of reusable public/private key pairs. After verifying the information received from the computing device, the attestation service selects a public/private key pair from the collection of reusable public/private key pairs and generates an attestation certificate for the computing device and public key of the public/private key pair. This attestation certificate is digitally signed by the attestation service, certifying that the public key of the selected public/private key pair is associated with the trusted secure component of the computing device. This attestation certificate is thus also referred to as an attestation statement or key attestation statement.

The attestation service returns the attestation certificate to the computing device along with the private key of the selected public/private key pair. The private key is encrypted with a key bound to the trusted secure component of the computing device, allowing the private key to be securely transmitted to the trusted secure component of the computing device. The trusted secure component receives and stores the attestation certificate as well as the public/private key pair.

When subsequently communicating with a relying party that desires proof that the computing device is the entity it claims to be, the trusted secure component provides to the relying party proof of possession of the attestation certificate and the public/private key pair. This proof can be provided in various manners, such as by digitally signing, using the private key of the public/private key pair, a data value (e.g., a nonce) provided to the trusted secure component by the relying party.

The attestation service can and does select the same public/private key pair from the collection of public/private key pairs for multiple different computing devices requesting an attestation certificate. Accordingly, multiple different computing devices will use the same public/private key pair at the same time. Allowing multiple different computing devices to have the same public/private key pair prevents different relying parties from colluding and determining the identity of a particular computing device. For example, if two different relying parties are accessed by one or more computing devices using the same public/private key pair and attestation certificate, the two different relying parties cannot know if it is the same computing device accessing both of them or two different computing devices that were given the same public/private key pair. This provides anonymity to the computing devices because the relying parties cannot collude and share information regarding a particular computing device because the relying parties cannot be sure that they are communicating with the same computing device.

Additionally, the trusted secure component can optionally use the public/private key pair received from the attestation service to generate its own public/private key pairs and attestation certificates that chain up to the attestation service. This allows the trusted secure component to generate new public/private key pairs and attestation certificates for use with different relying parties. Furthermore, each of these new public/private key pairs chains up to a key of the attestation service that was provided to multiple different computing devices, thus allowing the trusted secure component to quickly generate new public/private key pairs (without having to access the attestation service) while still providing the anonymity of the same public/private key pairs being selected for different computing devices.

References are made herein to symmetric key cryptography, public key cryptography and public/private key pairs. Although such key cryptography is well-known to those skilled in the art, a brief overview of such cryptography is included here to assist the reader. In public key cryptography (also referred to asymmetric public/private key pair cryptography), an entity (such as a user, hardware or software component, a device, a domain, and so forth) has associated with it a public/private key pair. This public/private key pair is also referred to as an asymmetric key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key).

FIG. 1 illustrates an example system 100 implementing the key attestation statement generation providing device anonymity in accordance with one or more embodiments. System 100 includes a computing device 102 that can communicate with an attestation service 104 and a relying party system 106 via a network 108. The network 108 can be a variety of different networks, including the Internet, a local area network (LAN), a phone network, an intranet, other public and/or proprietary networks, combinations thereof, and so forth.

The computing device 102 can be a variety of different types of devices. For example, the computing device 102 can be a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, augmented reality (AR) devices, virtual reality (VR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The attestation service 104 is a service or system implemented by one or more computing devices of the same or different types. Similar to the discussion of the computing device 102, the attestation service 104 can be implemented by a variety of different types of devices, ranging from full resource devices with substantial memory and processor resources to low-resource devices with limited memory and/or processing resources.

The relying party system 106 is implemented by one or more computing devices of the same or different types. Similar to the discussion of the computing device 102, the relying party system 106 can be implemented by a variety of different types of devices, ranging from full resource devices with substantial memory and processor resources to low-resource devices with limited memory and/or processing resources.

FIG. 1 illustrates an example system 100 with a single computing device 102, a single attestation service 104, and a single relying party system 106. It should be noted, however, that the system 100 can include multiple computing devices 102, multiple attestation services 104, and/or multiple relying party systems 106.

The computing device 102 includes a trusted secure component 112, one or more applications 114, and an operating system 116. The trusted secure component 112 is a component that is deemed trustworthy by the attestation service 104. The trusted secure component 112 is discussed in more detail below, and can include particular hardware components, particular software components, loading or booting of the computing device 102 in a particular manner or sequence, and so forth.

The operating system 116 includes one or more programs that provide various functionality to the computing device 102, including facilitating communication with hardware components of the computing device 102. One or more applications 114 can be run on the operating system 116, such as entertainment applications, educational applications, productivity applications, and so forth. Programs of the operating system 116 and/or the applications 114 can access the relying party system 106. Although illustrated as separate from the trusted secure component 112, one or more applications 114 can be included in the trusted secure component 112 and/or at least part of the operating system 116 can be included in the trusted secure component 112.

The relying party system 106 can be any of a variety of different systems that provide information or functionality to the computing device 102. These can be, for example, systems that allow the computing device 102 to access various types of entertainment content (e.g., audio and/or video content), systems that allow the computing device 102 to run various educational or productivity applications, systems that allow the computing device 102 to access secure or confidential information, and so forth.

In order to access the relying party system 106, the trusted secure component 112 obtains an attestation certificate from the attestation service 104. In one or more embodiments, the attestation certificates discussed herein are X.509 certificates in accordance with any of the X.509 certificate standards (e.g., the Network Working Group Request for Comments 1422 (February 1993)). The trusted secure component 112 sends an attestation certificate request to the attestation service 104 that includes information describing the computing device 102 including information describing the trusted secure component 112.

The attestation service 104 includes an attestation certificate system supporting client anonymity 122 and a key collection 124. The key collection 124 is a collection of multiple public/private key pairs. The key collection 124 can be maintained in a variety of different manners, such as in a storage device (e.g., a magnetic drive, a solid state drive) or in other memory (e.g., random access memory (RAM)). The attestation certificate system supporting client anonymity 122 receives the attestation certificate request from the trusted secure component 112 and verifies the information received as part of the attestation certificate request. This verification is discussed in more detail below, and can include various actions such as verifying that the computing device includes particular hardware, verifying that particular software is running on the computing device, and so forth. The manner in which the verification is performed can vary based on the manner in which the trusted secure component 112 is implemented.

If the attestation certificate system supporting client anonymity 122 cannot verify the information received as part of the attestation certificate request, then the attestation certificate system supporting client anonymity 122 does not issue an attestation certificate to the computing device 102. However, if the attestation certificate system supporting client anonymity 122 does verify the information received as part of the attestation certificate request, then the attestation certificate system supporting client anonymity 122 selects a public/private key pair from the key collection 124 and generates an attestation certificate for the computing device 102. This attestation certificate associates the trusted secure component 112 with the selected public/private key pair, and is digitally signed by the attestation certificate system supporting client anonymity 122.

The attestation certificate system supporting client anonymity 122 returns the attestation certificate to the computing device 102 along with the private key of the selected public/private key pair. The attestation certificate system supporting client anonymity 122 encrypts the private key with a key bound to the trusted secure component 112, such as a public key of a public/private key pair of the trusted secure component 112, allowing the private key of the selected public/private key pair to be securely transmitted to the trusted secure component 112. The trusted secure component 112 receives and stores the attestation certificate as well as the public/private key pair in the key store 126.

The computing device 102 can use the relying party system 106 by providing proof to the relying party system 106 that the trusted secure component 112 has been issued an attestation certificate by the attestation service 104. Given the attestation certificate and the public/private key pair selected for the computing device 102, this proof can be provided to the relying party system 106 in a variety of different manners. For example, the relying party system 106 can provide a nonce to the trusted secure component 112 and the trusted secure component 112 digitally signs the nonce using the private key of the public/private key pair received from the attestation service 104. The digital signature of the attestation service 104 on the attestation certificate can be verified by the relying party system 106 using the public key of the attestation service 104. The digital signature on the nonce can also be verified by the relying party system 106 using the public key included in the attestation certificate, thereby proving to the relying party system 106 that the attestation certificate (and the public key referenced by the attestation certificate) was provided to the computing device 102 by the attestation service 104.

The relying party system 106 optionally includes various additional checks or verifications in order to allow the computing device 102 to use the relying party system 106. For example, the relying party system 106 may impose a restriction that the trusted secure component 112 of the computing device 102 must be at least a particular version number.

Figure 2:
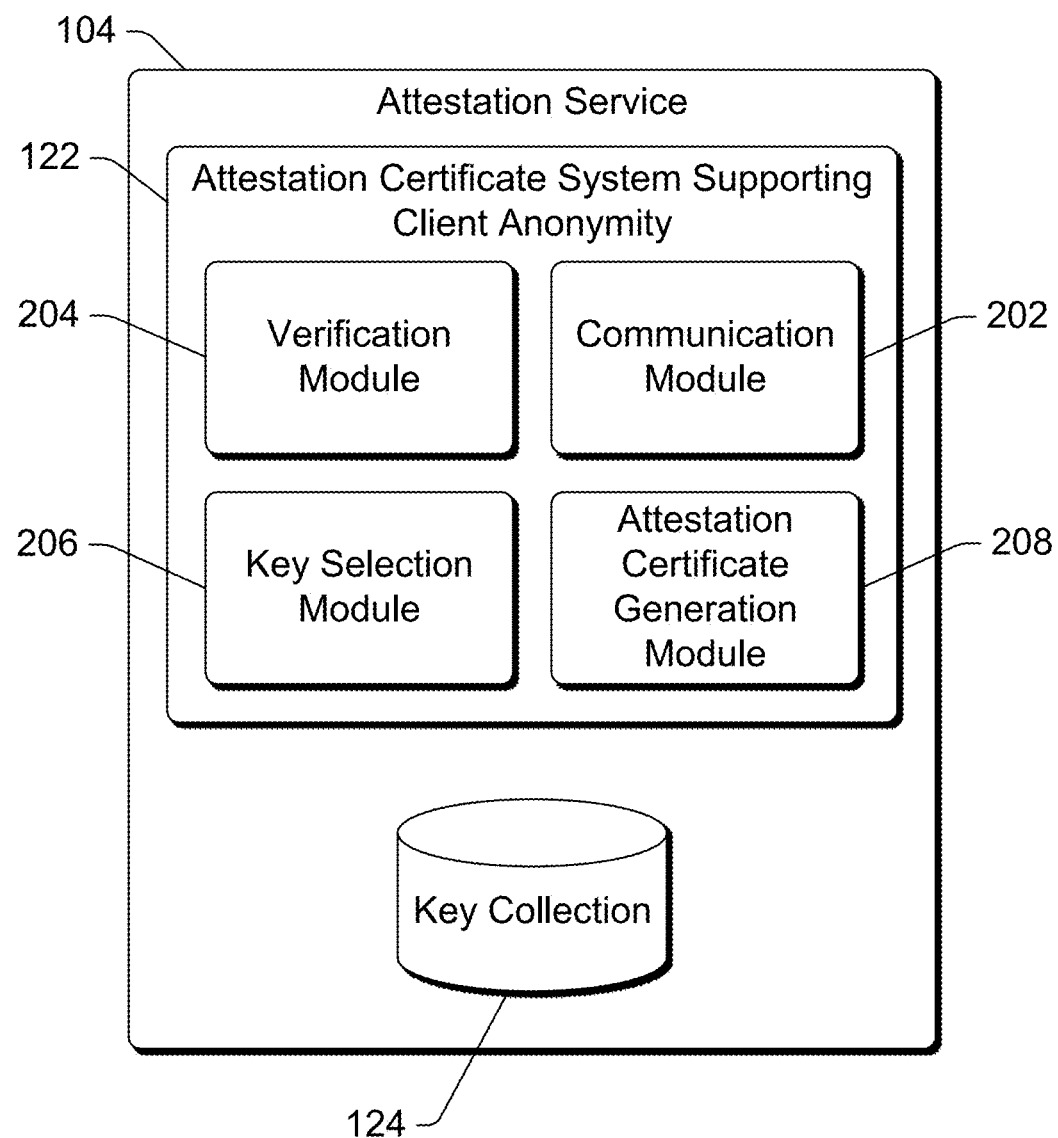
FIG. 2 illustrates an example attestation service in accordance with one or more embodiments.

FIG. 2 illustrates an example attestation service 104 in accordance with one or more embodiments. The attestation service 104 includes the attestation certificate system supporting client anonymity 122 and the key collection 124. The attestation certificate system supporting client anonymity 122 includes a communication module 202, a verification module 204, a key selection module 206, and an attestation certificate generation module 208.

The communication module 202 receives the request for an attestation certificate from the computing device 102 of FIG. 1. Although discussed with reference to the computing device 102 of FIG. 1, it should be noted that the attestation service 104 can, and typically does, receive requests for attestation certificates from multiple different computing devices 102. The request includes information describing the computing device 102, as discussed above.

The verification module 204 verifies the information describing the computing device 102. The specific information that is received from the computing device 102 can vary, and the manner in which the verification module 204 verifies the information describing the computing device 102 also varies at least in part based on the manner in which the trusted secure component 112 is implemented.

Returning to FIG. 1, generally the trusted secure component 112 is implemented so that the trusted secure component 112 includes hardware and/or software that allows the computing device 102 to run in a state that is trusted by the attestation service 104. A state that is trusted by the attestation service 104 is a state that, for example, is protected against malware that may attack the computing device 102, that allows the attestation service 104 to be assured that the attestation service 104 is communicating with the computing device 102 (or the trusted secure component 112 of the computing device 102) rather than another device posing as the computing device 102 and/or the trusted secure component 112, and so forth.

In one or more embodiments, the trusted secure component 112 includes a secure cryptoprocessor that is a trusted platform module (TPM). The TPM includes various functionality, such as key generation, encryption, decryption, secure storage (e.g., platform configuration registers), and so forth. In one or more embodiments, the TPM conforms to the Trusted Computing Group Trusted Platform Module specification version 2.0, published as the Trusted Platform Module Library specification, Family "2.0", Level 00, Revision 01.16 (Oct. 30, 2014), Parts 1-4. Although reference is made herein to a TPM, the trusted secure component 112 can alternatively use one or more other cryptoprocessors that provide functionality similar to the TPM.

The trusted secure component 112 has an associated public/private key pair. This allows other devices or components to encrypt data using the public key of the trusted secure component public/private key pair so that only the trusted secure component 112 can decrypt the data. In one or more embodiments, the trusted secure component 112 can retrieve its associated public/private key pair from a TPM only if the computing device 102 has booted into a particular mode or booted loading software in a particular order. This provides additional protection to the trusted secure component 112, allowing the trusted secure component 112 to access its associated public/private key pair only if the computing device has booted into a particular known mode (e.g., a secure or trusted mode) or with particular software (e.g., no malware).

In one or more embodiments, the information describing the computing device 102 that accompanies the request for the attestation certificate indicates the health (or health attestation) of the computing device 102. The health of the computing device 102 can be specified in a variety of different manners, such as an indication of which modules were loaded when booting the computing device 102, an indication of whether a particular module or functionality was loaded when booting the computing device 102, an indication of whether the computing device 102 was booted in a particular mode (e.g., in a secure boot mode), an indication of whether particular security features are turned on or turned off, an indication of whether a virtual secure mode (VSM) is running in the computing device 102 (e.g., as part of the trusted secure component 112), and so forth.

Additionally or alternatively, the information describing the computing device 102 that accompanies the request for the attestation certificate indicates that the trusted secure component 112 is a component (e.g., a hardware component) that is trusted by the attestation service 104 (also referred to as key attestation). The trusted secure component 112 can have a public/private key pair, and the public key of this public/private key pair can be known to the attestation service 104. Thus, the trusted secure component 112 can provide an indication that it is indeed the trusted secure component 112 by digitally signing a value (e.g., a nonce) using the private key of the public/private key pair of the trusted secure component 112.

Returning to FIG. 2, the verification module 204 verifies the information describing the computing device 102 that accompanies the request for the attestation certificate. For example, for a health attestation, the verification module 204 can verify that the information received from the computing device 102 indicates that particular modules were loaded when booting the computing device 102, that the computing device 102 was booted in a particular mode (e.g., in a secure boot mode), that particular security features are turned on or turned off, and so forth. By way of another example, for key attestation, the verification module 204 can verify the digital signature on a value (e.g., a nonce) digitally signed by the trusted secure component 112.

If the verification module 204 does not verify the information received from the computing device 102, then no key is selected for the computing device 102 and an attestation certificate is not generated for the computing device 102. However, if the verification module 204 does verify the information received from the computing device 102, then the key selection module 206 selects an asymmetric key pair (a public/private key pair) from the key collection 124. The selection can be performed randomly, pseudorandomly, or in accordance with various other rules or criteria.

The key collection 124 can have any number of asymmetric key pairs, such as tens, hundreds, thousands, or more. The asymmetric key pairs in the key collection 124 can be previously generated (e.g., by the key selection module 206 or another module of the attestation service 104 prior to receipt of the request for the attestation certificate from the computing device 102) and maintained in the key collection 124, then selected from when desired by the key selection module 206. The number of asymmetric key pairs included in the key collection 124 can vary based on various different factors. In one or more embodiments, the number of asymmetric key pairs included in the key collection 124 is determined by balancing anonymity of the computing devices against the need to invalidate attestation certificates in the event a key is comprised (e.g., discovered or potentially discovered by malware). For example, fewer asymmetric key pairs result in increased anonymity to the computing devices because more computing devices get the same asymmetric key pair, but also result in the need to invalidate a large number of attestation certificates in the event that an asymmetric key pair is compromised because a large number of computing devices received the compromised asymmetric key pair.

It should also be noted that the asymmetric key pairs included in the key collection 124 can change over time. For example, the key selection module 206 can generate new asymmetric key pairs to add to the key collection 124 at regular or irregular intervals, and can delete asymmetric key pairs from the key collection 124 at regular or irregular intervals.

The attestation certificate generation module 208 generates a certificate that associates the certificate with the public key of the selected public/private key pair. The attestation certificate also associates the trusted secure component 112 (and/or the computing device 102) with the public key of the selected public/private key pair. This association is performed, for example, by the certificate including the public key of the selected public/private key pair and the private key of the selected public/private key pair being securely provided to the trusted secure component 112 (e.g., encrypted using a key of the trusted secure component 112). In order to maintain anonymity of the trusted secure component 112 (and/or the computing device 102), a name or other identifier of the trusted secure component 112 and/or the computing device 102 need not be included in the generated certificate. The attestation certificate generation module 208 digitally signs the certificate using a public key of a public/private key pair of the attestation service 104, creating the attestation certificate that allows a relying party to know that the attestation service 104 verified the trusted secure component 112 and gave the trusted secure component 112 the selected public/private key pair.

The communication module 202 returns to the trusted secure component 112 the attestation certificate as well as the private key of the public/private key pair selected by the key selection module 206. The private key of the selected public/private key pair is encrypted (e.g., using the public key of the public/private key pair of the trusted secure component 112) so that the private key is securely transmitted to the trusted secure component 112 and cannot be read by any eavesdropping or other intermediary devices. The attestation certificate can also be, but need not be, encrypted so as to be securely transmitted to the trusted secure component 112.

Thus, the attestation certificate generated by the attestation certificate generation module 208 includes the public key of the selected public/private key pair. The attestation certificate is digitally signed by the attestation certificate generation module 208, proving that the public key of the selected public/private key pair was given out with this attestation certificate. The private key of the selected public/private key pair is then securely provided to the trusted secure component 112. When the computing device 102 subsequently desires to access a relying party 104, the relying party 104 can provide a nonce to the computing device trusted secure component 112. The trusted secure component 112 digitally signs the nonce using the private key of the selected public/private key pair, and sends the signed nonce as well as the attestation certificate to the relying party 104. The relying party 104 uses the public key of the attestation service 104 to verify that the attestation certificate generation module 208 did indeed digitally sign (and thus give out) the attestation certificate. Furthermore, the relying party 104 can use the public key in the attestation certificate to verify that the nonce was digitally signed by a trusted secure component that was trusted by the attestation service 104 (because the trusted secure component 112 would only have the private key that is part of the same public/private key pair as the public key in the certificate if the attestation service 104 trusted the trusted secure component 112 and gave the trusted secure component 112 the private key). The relying party 104 can thus verify that the trusted secure component 112 is trusted by the attestation service 104, but the certificate relied upon by the relying party 104 need not have the name or other identifier of the particular trusted secure component 112 and/or computing device 102.

Figure 3:
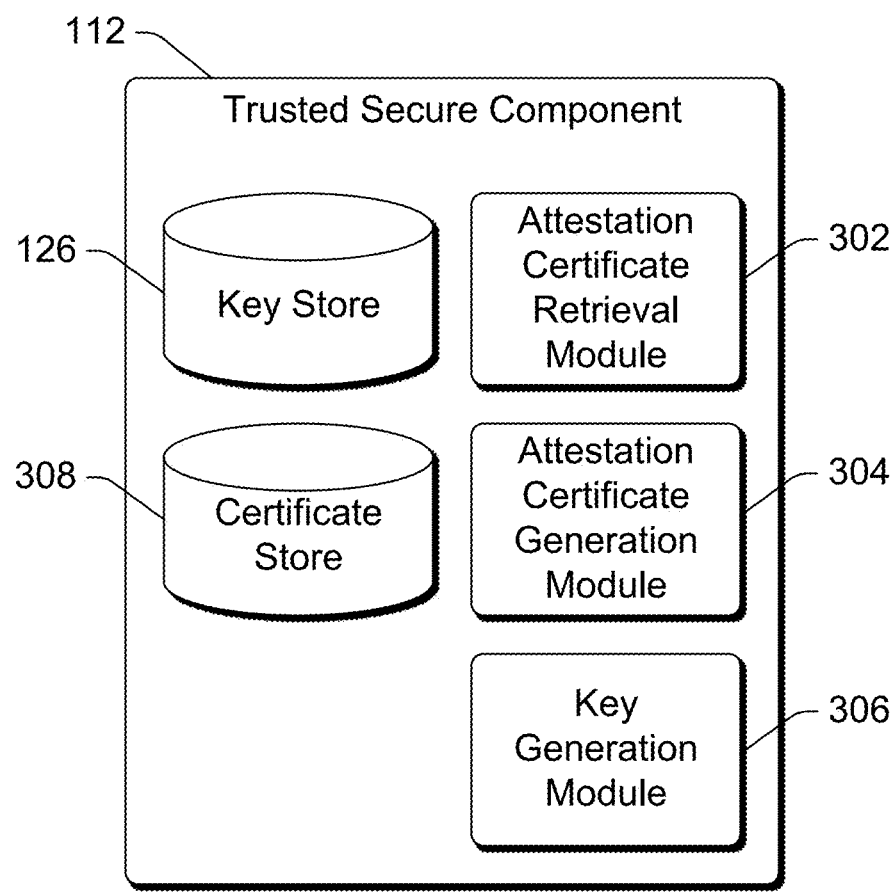
FIG. 3 illustrates an example trusted secure component in accordance with one or more embodiments.

FIG. 3 illustrates an example trusted secure component 112 in accordance with one or more embodiments. The trusted secure component 112 includes the key store 126, an attestation certificate retrieval module 302, an attestation certificate generation module 304, a key generation module 306, and a certificate store 308.

The attestation certificate retrieval module 302 communicates with the attestation service 104, sending a request for an attestation certificate and receiving the attestation certificate and encrypted private key from the attestation service 104. The public/private key pair (or at least the private key of the public/private key pair) received from the attestation service 104 is stored in the key store 126. The attestation certificate received from the attestation service 104 is also stored in a certificate store 308. The key store 126 is a secure store, accessible only to modules of the trusted secure component 112. The certificate store 308 can be, but need not be, a secure store. Additionally or alternatively, the attestation certificate can be stored external to the trusted secure component 112.

The trusted secure component 112 is trusted by the attestation service 104, and thus the attestation certificate generation module 304 can also generate attestation certificates. The key generation module 306 generates public/private key pairs using any of a variety of public or proprietary techniques. The attestation certificate generation module 304 generates a certificate that associates the certificate with the public key of the newly generated public/private key pair. The attestation certificate also associates the trusted secure component 112 (and/or the computing device 102) with the public key of the public/private key pair newly generated by the key generation module 306. This association is performed, for example, by the certificate including the public key of the newly generated public/private key pair and the private key of the newly generated public/private key pair being maintained securely by the trusted secure component 112 (e.g., stored in the key store 126). In order to maintain anonymity of the trusted secure component 112 (and/or the computing device 102), a name or other identifier of the trusted secure component 112 and/or the computing device 102 need not be included in the newly generated certificate. The attestation certificate generation module 304 digitally signs the certificate using the public key of the public/private key pair received from the attestation service 104, creating an attestation certificate that chains up to the attestation service 104 and thus allows a relying party to know that the attestation service 104 verified the trusted secure component 112. Furthermore, because the attestation certificates generated by the attestation certificate generation module 304 are digitally signed using the public key of the public/private key pair received from the attestation service 104 and chains to the attestation service 104 based on that public key, and multiple different computing devices will receive that same public key and generate attestation certificates based on that same public key, anonymity of the computing device 102 is maintained despite the computing device 102 generating its own attestation certificates.

The public/private key pair (or at least the private key of the public/private key pair) generated by the key generation module 306 is stored in the key store 126. The attestation certificate generated by the attestation certificate generation module 304 is stored in the certificate store 308.

The attestation certificate generation module 304 and key generation module 306 can generate new keys and attestation certificates as desired. This allows new keys and attestation certificates to be generated without accessing the network 108 and the attestation service 104 for each new key and attestation certificate, reducing the amount of time needed to obtain a new key and attestation certificate. By way of example, a new public/private key pair and attestation certificate can be generated for each new relying party system 106 that is accessed by the computing device 102, for each new web site that is accessed by a web browser running on the computing device 102, and so forth.

Figure 4:
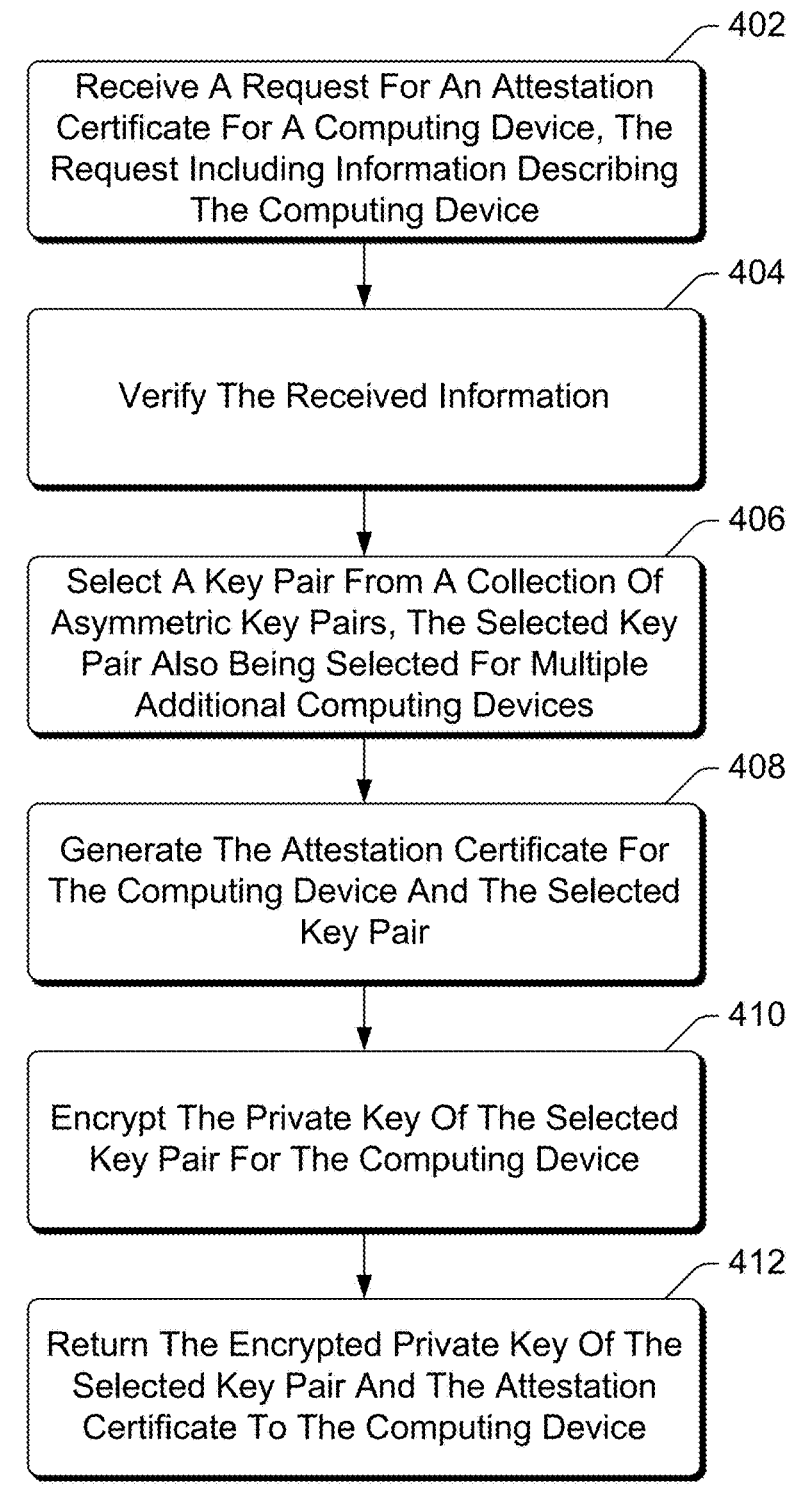
FIG. 4 is a flowchart illustrating an example process for implementing the key attestation statement generation providing device anonymity in accordance with one or more embodiments.

FIG. 4 is a flowchart illustrating an example process 400 for implementing the key attestation statement generation providing device anonymity in accordance with one or more embodiments. Process 400 is carried out by an attestation service, such as attestation service 104 of FIG. 1 or FIG. 2, and can be implemented in software, firmware, hardware, or combinations thereof. Process 400 is shown as a set of acts and is not limited to the order shown for performing the operations of the various acts. Process 400 is an example process for implementing the key attestation statement generation providing device anonymity; additional discussions of implementing the key attestation statement generation providing device anonymity are included herein with reference to different figures.

In process 400, a request for an attestation certificate for a computing device is received (act 402). The request includes information describing software and/or hardware of the computing device. The information can indicate the health of the computing device and/or that the a trusted secure component is a component that is trusted by the attestation service as discussed above.

The received information is verified (act 404). The manner in which the attestation service verifies the information varies based at least in part on the information that is received as discussed above.

An asymmetric key pair is selected from a collection of asymmetric keys (act 406). Each of the asymmetric keys in the collection of keys is a public/private key pair, and one of the key pairs is selected in various manners as discussed above, such as randomly or pseudorandomly.

An attestation certificate for the computing device and the selected key pair is generated (act 408). The attestation certificate associates the public key of the selected key pair with the attestation certificate.

The private key of the selected key pair is also encrypted for the computing device (act 410). The selected asymmetric key pair can be encrypted, or just the private key of the selected asymmetric key pair can be encrypted. The private key of the selected key pair is encrypted using a public key of a public/private key pair of a trusted secure component of the computing device. The public key of the trusted secure component can be included in the information describing the computing device received in act 402 or can be otherwise obtained.

The encrypted private key of the selected key pair and the attestation certificate are returned to the computing device (act 412). The encrypted private key of the selected key pair and the attestation certificate can be returned in various manners, such as transmitted to the computing device via a network.

Figure 5:
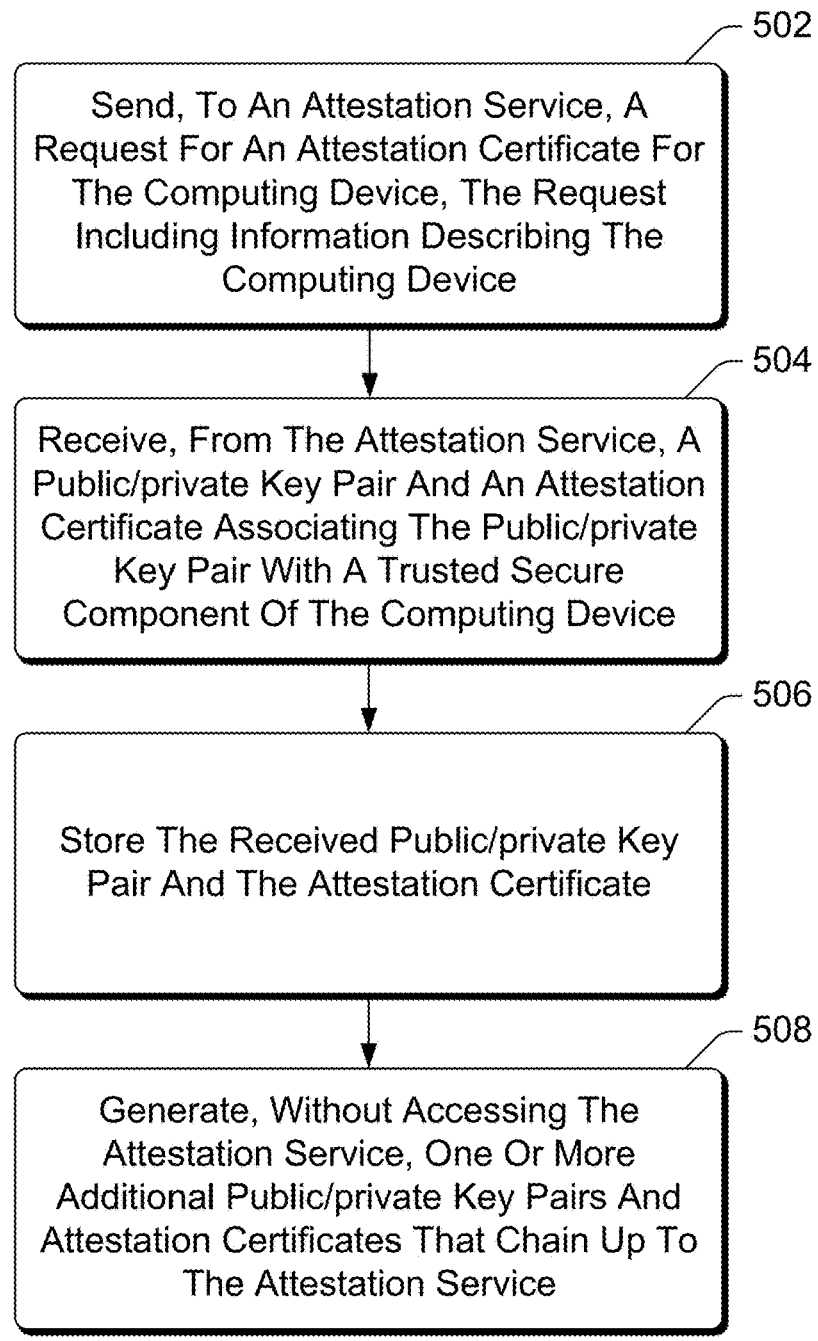
FIG. 5 is a flowchart illustrating another example process for implementing the key attestation statement generation providing device anonymity in accordance with one or more embodiments.

FIG. 5 is a flowchart illustrating an example process 500 for implementing the key attestation statement generation providing device anonymity in accordance with one or more embodiments. Process 500 is carried out by a computing device, such as computing device 102 of FIG. 1, and can be implemented in software, firmware, hardware, or combinations thereof. Process 500 is shown as a set of acts and is not limited to the order shown for performing the operations of the various acts. Process 500 is an example process for implementing the key attestation statement generation providing device anonymity; additional discussions of implementing the key attestation statement generation providing device anonymity are included herein with reference to different figures.

In process 500, a request for an attestation certificate for the computing device is sent to at attestation service (act 502). The request includes information describing software and/or hardware of the computing device. The information can indicate the health of the computing device and/or that the a trusted secure component is a component that is trusted by the attestation service as discussed above.

In response to the request, a public/private key pair and attestation certificate is received from the attestation service (act 504). The public/private key pair and attestation certificate are received if the information for the computing device sent to the attestation service in act 502 is verified by the attestation service. The attestation certificate associates the public key of the received public/private key pair with the computing device (and/or the trusted secure component of the computing device). This association is made, for example, by the attestation certificate including the public key of the received public/private key pair and the private key of the received public/private key pair being securely provided to the computing device (e.g., encrypted using a key of a trusted secure component of the computing device).

The received public/private key pair and the attestation certificate are stored (act 506). The private key of the received public/private key pair is stored in a secure store of the trusted secure component of the computing device. The public key of the received public/private key pair and the attestation certificate can be stored in the secure store or alternatively elsewhere.

One or more additional public/private key pairs and attestation certificates that chain up to the attestation service are generated (act 508). These additional public/private key pairs and attestation certificates are generated by the trusted secure component without accessing the attestation service.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
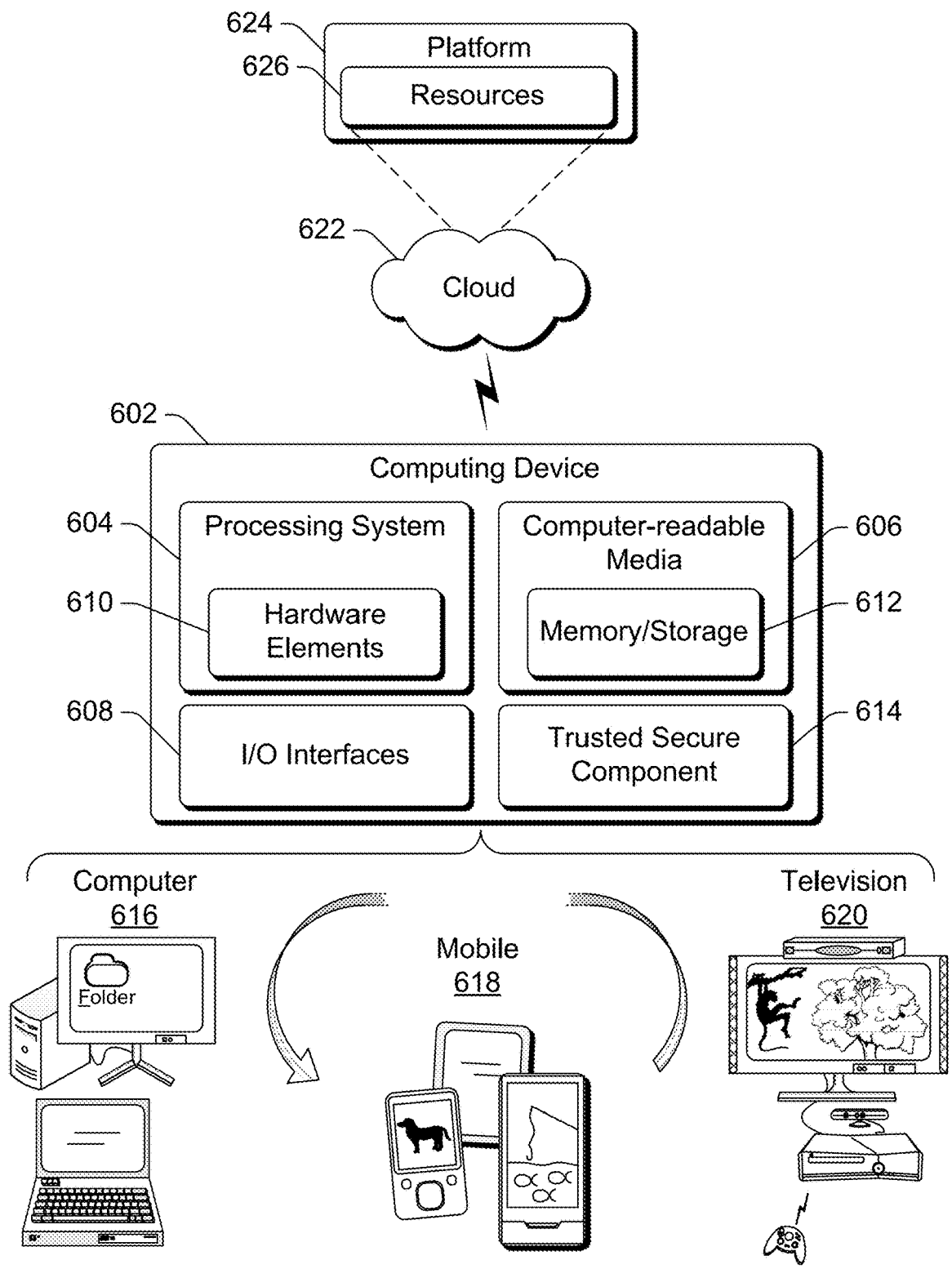
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Resistive RAM (ReRAM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The memory/storage 612 may include storage-class memory (SCM) such as 3D Xpoint memory available from Intel Corporation of Santa Clara, Calif. or Micron Technology, Inc. of Boise, Id. The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

In one or more embodiments, the computing device 602 is a computing device 102 of FIG. 1, and includes a trusted secure component 614. The trusted secure component 614 obtains an attestation certificate from an attestation service and also generates additional public/private key pairs and attestation certificates that chain up to the attestation service as discussed above. The trusted secure component 614 can implement, for example, the trusted secure component 112 of FIG. 1 or FIG. 3.

Alternatively, the computing device 602 is a computing device that implements at least part of attestation service 104 of FIG. 1 or FIG. 2. In such situations the computing device 602 need not include the trusted secure component 614. Rather, the computing device 602 includes an attestation certificate system supporting client anonymity, such as the attestation certificate system supporting client anonymity 122 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in an attestation service, the method comprising: receiving, from a first computing device, a first request for an attestation certificate for the first computing device, the request including information describing the hardware and/or software of the first computing device; verifying the received information; selecting an asymmetric key pair from a collection of asymmetric key pairs, the selected key pair also being selected for multiple additional computing devices; generating the attestation certificate for the first computing device associating the public key of the selected key pair with the attestation certificate; encrypting the private key of the selected key pair for the first computing device; and returning the encrypted private key of the selected key pair and the attestation certificate to the first computing device.

Alternatively or in addition to any of the methods, systems, or computing devices described herein, any one or combination of: wherein encrypting the private key of the selected key pair for the first computing device comprises encrypting the private key of the selected key pair using a public key of a public/private key pair of a trusted secure component of the first computing device; wherein selecting the asymmetric key pair comprises randomly or pseudorandomly selecting the asymmetric key pair from the collection of asymmetric key pairs; further comprising generating, prior to receipt of the first request, the asymmetric key pairs in the collection of asymmetric key pairs; further comprising changing the asymmetric key pairs in the collection of asymmetric key pairs at one or more intervals; further comprising receiving, from a second computing device, a second request for an attestation certificate for the second computing device, the second request including information describing the hardware and/or software of the second computing device, verifying the received information describing the hardware and/or software of the second computing device, selecting, from the collection of asymmetric key pairs, the same key pair as was selected for the first computing device, generating the attestation certificate for the second computing device associating the public key of the selected key pair with the attestation certificate for the second computing device, encrypting the private key of the selected key pair for the second computing device, and returning the encrypted private key of the selected key pair and the attestation certificate for the second computing device to the second computing device; the attestation certificate having no name or identifier of the first computing device.

A method implemented in a computing device, the method comprising: sending, to an attestation service, a request for an attestation certificate for the computing device, the request including information describing the hardware and/or software of the computing device; receiving, from the attestation service, a public/private key pair and the attestation certificate that associates the public/private key pair with a trusted secure component of the computing device; storing, in a secure store of the trusted secure component, the private key of the public/private key pair; and generating, without accessing the attestation service, one or more additional public/private key pairs and one or more additional attestation certificates, each additional attestation certificates chaining up to the attestation service.

Alternatively or in addition to any of the methods, systems, or computing devices described herein, any one or combination of: the received public/private key pair being a same public/private key pair as is provided by the attestation service to multiple other computing devices; further comprising generating one of the one or more additional public/private key pairs and one or more additional attestation certificates for each web site accessed by a web browser of the computing device; further comprising generating one of the one or more additional public/private key pairs and one or more additional attestation certificates for each of multiple different relying party systems accessed by the computing device; further comprising decrypting the public/private key pair received from the attestation service using a private key of the trusted secure component; the trusted secure component comprising a trusted platform module.

A system comprising: one or more processors; and a computer-readable storage medium having stored thereon multiple instructions that, responsive to execution by the one or more processors, cause the one or more processors to: receive, from a first computing device, a first request for an attestation certificate for the first computing device, the request including information describing the hardware and/or software of the first computing device; verify the received information; select an asymmetric key pair from a collection of asymmetric key pairs, the selected asymmetric key pair also being selected for multiple additional computing devices; generate the attestation certificate for the first computing device associating the public key of the selected key pair with the attestation certificate; encrypt the private key of the selected key pair for the first computing device; and return the encrypted private key of the selected key pair and the attestation certificate to the first computing device.

Alternatively or in addition to any of the methods, systems, or computing devices described herein, any one or combination of: wherein to encrypt the private key of the selected key pair for the first computing device is to encrypt the private key of the selected key pair using a public key of a public/private key pair of a trusted secure component of the first computing device; the trusted secure component comprising a trusted platform module; wherein to select the asymmetric key pair is to randomly or pseudorandomly select the asymmetric key pair from the collection of asymmetric key pairs; the multiple instructions further causing the one or more processors to change keys in the collection of asymmetric key pairs at one or more intervals; the multiple instructions further causing the one or more processors to receive, from a second computing device, a second request for an attestation certificate for the second computing device, the second request including information describing the hardware and/or software of the second computing device, verify the received information describing the hardware and/or software of the second computing device, select, from the collection of asymmetric key pairs, the same key pair as was selected for the first computing device, generate the attestation certificate for the second computing device associating the public key of the selected key pair with the attestation certificate for the second computing device, encrypt the private key of the selected key pair for the second computing device, and return the encrypted private key of the selected key pair and the attestation certificate for the second computing device to the second computing device; the attestation certificate having no name or identifier of the first computing device.

A computing device comprising: one or more processors; and a computer-readable storage medium having stored thereon multiple instructions that, responsive to execution by the one or more processors, cause the one or more processors to perform acts comprising: sending, to an attestation service, a request for an attestation certificate for the computing device, the request including information describing the hardware and/or software of the computing device; receiving, from the attestation service, a public/private key pair and the attestation certificate that associates the public/private key pair with a trusted secure component of the computing device; storing, in a secure store of the trusted secure component, the private key of the public/private key pair; and generating, without accessing the attestation service, one or more additional public/private key pairs and one or more additional attestation certificates, each additional attestation certificates chaining up to the attestation service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device-implemented method in an attestation service, the method comprising:
receiving, from a first computing device, a first attestation certificate request that corresponds to the first computing device, the first attestation certificate request including information describing first computing device hardware and/or software;
verifying the received information;
selecting an asymmetric key pair from an asymmetric key pair collection, the selected asymmetric key pair also being concurrently associated with each of multiple additional computing devices which are provided with a private key, of the selected asymmetric key pair, that is encrypted;
generating a first attestation certificate that corresponds to the first computing device and that associates a public key of the selected key pair with the first attestation certificate;
encrypting the private key specifically to the first computing device; and
returning the encrypted private key and the first attestation certificate to the first computing device.

2. The method as recited in claim 1, wherein encrypting the private key specifically to the first computing device comprises encrypting the private key of the selected key pair using a public key of a public/private key pair of a first computing device trusted secure component.

3. The method as recited in claim 1, wherein selecting the asymmetric key pair comprises randomly or pseudo-randomly selecting the asymmetric key pair from the asymmetric key pair collection.

4. The method as recited in claim 1, further comprising generating, prior to receipt of the first request, asymmetric key pairs in the asymmetric key pair collection.

5. The method as recited in claim 1, further comprising changing asymmetric key pairs in the asymmetric key pair collection at one or more intervals.

6. The method as recited in claim 1, further comprising:
receiving, from a second computing device, a second attestation certificate request that corresponds to the second computing device, the second attestation certificate request including additional information describing second computing device hardware and/or software;
verifying the received additional information;
selecting, from the asymmetric key pair collection, the asymmetric key pair that was previously selected for the first computing device;
generating a second attestation certificate that corresponds to the second computing device and that associates the public key with the second attestation certificate;
encrypting the private key specifically to the second computing device generating another encrypted private key; and
returning the other encrypted private key and the second attestation certificate to the second computing device.

7. The method as recited in claim 1, the first attestation certificate having no name or identifier of the first computing device.

8. A device-implemented method, the method comprising:
sending, to an attestation service, an attestation certificate request that corresponds to the device, the request including information describing device hardware and/or software;
receiving, from the attestation service, a public/private key pair comprising a private key and an attestation certificate that associates the public/private key pair with a device trusted secure component;
storing the private key in a secure store of the device trusted secure component; and
generating, without accessing the attestation service, one or more additional public/private key pairs and one or more additional attestation certificates, each of the additional attestation certificates chaining up to the attestation service.

9. The method as recited in claim 8, the received public/private key pair being a same public/private key pair as is provided by the attestation service to multiple other devices.

10. The method as recited in claim 8, further comprising generating one of the one or more additional public/private key pairs and one or more additional attestation certificates for each web site accessed by a web browser running on the computing device.

11. The method as recited in claim 8, further comprising generating one of the one or more additional public/private key pairs and one or more additional attestation certificates for each of multiple different relying party systems accessed by the device.

12. The method as recited in claim 8, further comprising decrypting the public/private key pair received from the attestation service using a private key of the device trusted secure component.

13. The method as recited in claim 8, the device trusted secure component comprising a trusted platform module.

14. A system comprising:
one or more processors; and
a computer-readable storage medium having stored thereon multiple instructions that, responsive to execution by the one or more processors, cause the one or more processors to:
receive, from a first computing device, a first attestation certificate request that corresponds to the first computing device, the request including information describing first computing device hardware and/or software;
verify the received information;
select an asymmetric key pair from an asymmetric key pair collection, the selected asymmetric key pair also being concurrently associated with each of multiple additional computing devices which are provided with a private key, of the selected asymmetric key pair, that is encrypted;
generate a first attestation certificate that corresponds to the first computing device and that associates a public key of the selected key pair with the first attestation certificate;
encrypt the private key specifically to the first computing device; and
return the encrypted private key and the first attestation certificate to the first computing device.

15. The system as recited in claim 14, wherein to encrypt the private key specifically to the first computing device is to encrypt the private key using a public key of a public/private key pair of a first computing device trusted secure component.

16. The system as recited in claim 15, the first computing device trusted secure component comprising a trusted platform module.

17. The system as recited in claim 14, wherein to select the asymmetric key pair is to randomly or pseudorandomly select the asymmetric key pair from the asymmetric key pair collection.

18. The system as recited in claim 14, the multiple instructions further causing the one or more processors to change keys in the asymmetric key pair collection at one or more intervals.

19. The system as recited in claim 14, the multiple instructions further causing the one or more processors to:
   receive, from a second computing device, a second attestation certificate request that corresponds to the second computing device, the second attestation certificate request including additional information describing second computing device hardware and/or software;
   verify the received additional information;
   select, from the asymmetric key pair collection, the asymmetric key pair that was previously selected for the first computing device;
   generate a second attestation certificate that corresponds to the second computing device and that associates the public key with the second attestation certificate;
   encrypt the private key specifically to the second computing device and generate another encrypted private key; and
   return the other encrypted private key and the second attestation certificate to the second computing device.

20. The system as recited in claim 14, the first attestation certificate having no name or identifier of the first computing device.

* * * * *